United States Patent
Chiu

(10) Patent No.: US 7,991,502 B2
(45) Date of Patent: Aug. 2, 2011

(54) TOOL COMPENSATION SYSTEM AND METHOD FOR ADJUSTING PARAMETERS OF A TOOL

(75) Inventor: Jhy-Hau Chiu, Taipei Hsien (TW)

(73) Assignee: Foxnum Technology Co., Ltd., Tu-Cheng, New Taipei (TW)

( * ) Notice: Subject to any disclaimer, the term of this patent is extended or adjusted under 35 U.S.C. 154(b) by 344 days.

(21) Appl. No.: 12/261,025

(22) Filed: Oct. 29, 2008

(65) Prior Publication Data

US 2010/0063618 A1  Mar. 11, 2010

(30) Foreign Application Priority Data

Sep. 8, 2008  (CN) .......................... 2008 1 0304408

(51) Int. Cl.
*G06F 19/00* (2011.01)
(52) U.S. Cl. ....................... 700/176; 700/193
(58) Field of Classification Search .................. 700/160, 700/176, 173, 182, 184–186, 193; 184/7.4; 318/565
See application file for complete search history.

(56) References Cited

U.S. PATENT DOCUMENTS 5,453,933 A * 9/1995 Wright et al. ................. 700/181
5,710,498 A * 1/1998 Yutkowitz et al. ............ 318/632
6,317,646 B1 * 11/2001 de Caussin et al. .......... 700/173
2003/0163286 A1 * 8/2003 Yasugi .......................... 702/185
2007/0145932 A1 * 6/2007 Kawai et al. .................. 318/575

OTHER PUBLICATIONS

Hong-Tao Chen, CNC Machined Techniques and Programming, Sep. 30, 2003, pp. 138, 139, and 143-146, ISBN 7-04-012634-6, Higher Education Press, Beijing city of China.
Li-Jian Zhou, Method of Determining Compensation for Milling Cutter in CNC Machine, Machinist (Cold Work), Oct. 31, 1999, Lines 28-36, col. 1, p. 13, and p. 14, ISSN 1674-1641, Machinery Industry Press, Beijing city of China.
Yong-Lian Long, Compensation for Milling Cutter in CNC Machining, Digital Manufacturing Industry, Jul. 31, 2008, Lines 19-23, col. 3, p. 99, ISSN 1671-8186, Machinery Industry Press, Beijing city of China.

* cited by examiner

*Primary Examiner* — Kidest Bahta
(74) *Attorney, Agent, or Firm* — Zhigang Ma

(57) ABSTRACT

A tool compensation system for adjusting parameters of a tool includes a controller and a selecting module. The controller includes a storing module, an invoking module, and a compensation module. The storing module is configured for storing serial numbers and data tables of a first and a second tools. Each data table of the first and second tools includes a plurality of first dimensional parameters and a plurality of second dimensional parameters. The selecting module is capable of selecting a tool for machining by selecting the serial number of the tool. The invoking module is configured for invoking the second dimensional parameters according to the first dimensional parameters of a tool selected by the selecting module. The compensation module is configured for adjusting machining parameters of the selected tool according to the second dimensional parameters.

16 Claims, 2 Drawing Sheets

TOOL COMPENSATION SYSTEM AND METHOD FOR ADJUSTING PARAMETERS OF A TOOL

BACKGROUND

1. Technical Field

The present disclosure relates to compensation systems and methods, and particularly to a tool compensation system and a tool compensation method for adjusting parameters of a tool.

2. Description of the Related Art

In a computer numerical control (CNC) system, a tool is a significant component used for machining metal workpieces. Generally, tool wear may occur during machining processes, which may result in different size variations of the workpieces. A method of compensating for tool wear is to adjust machining parameters of the tool via a human-machine interface after each machining circle. The machining parameters of the tool are stored in a controller. However, adjusting machining parameters manually every time is time-consuming.

DETAILED DESCRIPTION

Figure 1:
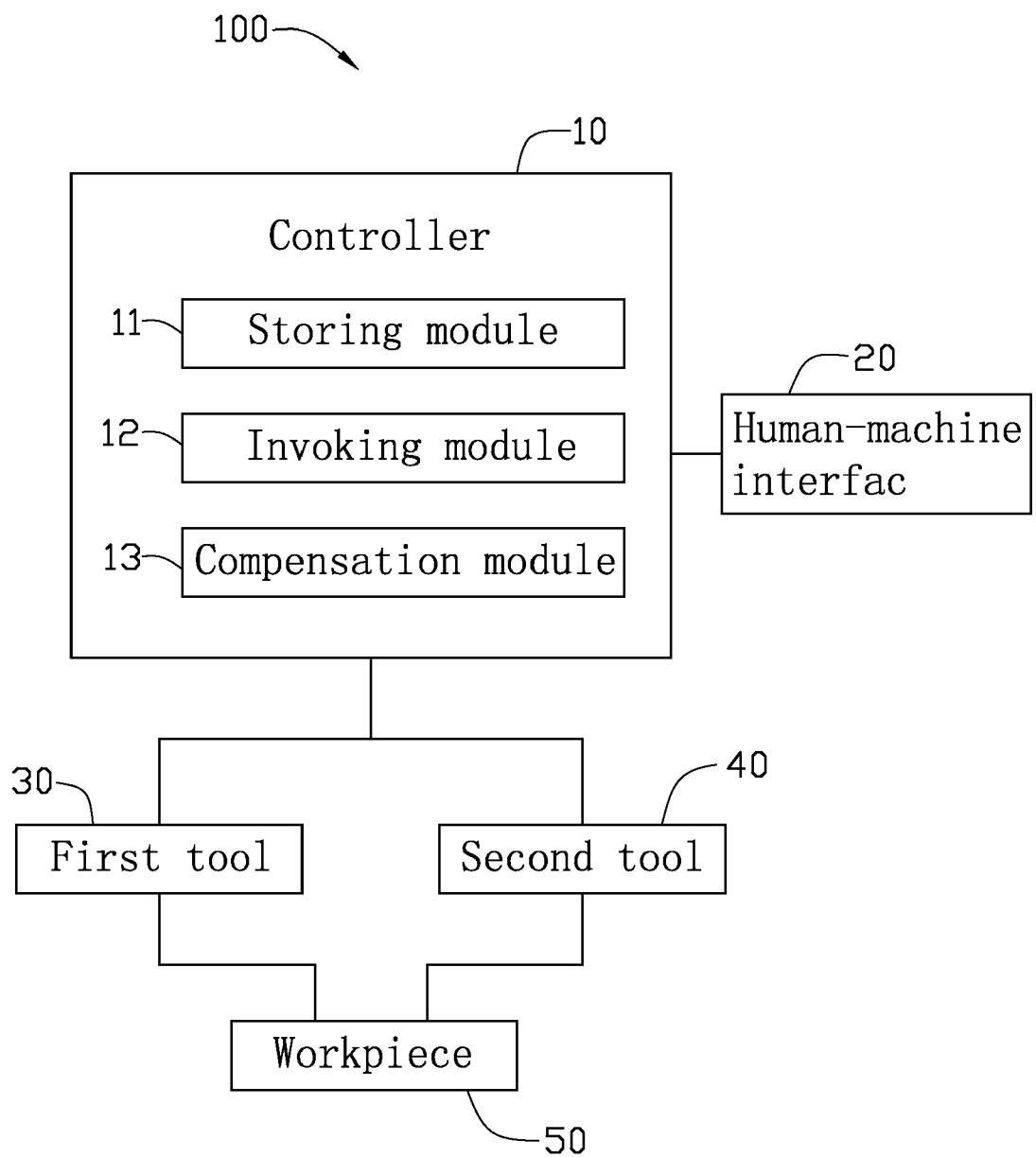
FIG. 1 is a block diagram of an exemplary embodiment of a tool compensation system for adjusting parameters of a tool.

Referring to FIG. 1, an exemplary embodiment of a tool compensation system 100 includes a controller 10 and a human-machine interface 20. The controller 10 includes a storing module 11, an invoking module 12, and a compensation module 13. The tool compensation system 100 is configured for adjusting a tool cutting length according to a tool wear dimension after a machining circle for example. It may be understood that a machining circle is a machining segment with a pre-determined tool cutting length. Generally, the tool compensation system 100 is applied in a computer numerical control (CNC) machine, such as a CNC milling machine. The first tool 30 and the second tool 40 may be fixed to the CNC milling machine for machining the workpiece 50. In one exemplary embodiment, the first tool 30 and the second tool 40 can be two milling cutters. The workpiece 50 can be an object made of metal for example.

The storing module 11 is employed to store serial numbers and data tables of the first tool 30 and the second tool 40. The first tool 30 is numbered with a first serial number as K1, and the second tool 40 is numbered with a second serial number as K2. Each of the data tables includes a plurality of first dimensional parameters and a plurality of second dimensional parameters. For example, a wear data table includes a plurality of tool cutting lengths as the plurality of first dimensional parameters and a plurality of tool wear dimensions as the plurality of second dimensional parameters. The plurality of tool cutting lengths and the plurality of tool wear dimensions are in a one-to-one relationship. For example, a first cutting length is about 1 mm, and a corresponding first tool wear dimension is about 0.01 mm; a second cutting length is about 2 mm, and a corresponding second tool wear dimension is about 0.015, and so on. Before the workpiece 50 is machined in practice, the wear data tables of the first tool 30 and the second tool 40 are created and stored in the storing module 11. Each tool wear dimension and the corresponding tool cutting length in the wear data tables are measured manually or by an automatic measurement system. Depending on the embodiment, the storing module may be a local cache file, a hard disk drive, a random access memory, a readable only memory, for example, but the disclosure is not limited thereto.

The human-machine interface 20, functioning as a selecting module, is configured for selecting the first tool 30 or the second tool 40 for machining by selecting the corresponding serial number K1 or K2. In other exemplary embodiments, a personal computer can function as the selecting module to be employed to select the corresponding serial number. The human-machine interface 20 is also capable of determining a tool cutting length of the selected tool for a machining circle.

The invoking module 12 is configured for invoking the wear data table of the selected tool, such as invoking the tool wear dimension of the corresponding wear data table according to the tool cutting length of the machining circle.

The compensation module 13 is configured for adjusting a tool cutting length of the selected tool according to the tool wear dimension invoked by the invoking module 12. For example, if the first tool 30 is selected for the machining circle, the first tool 30 finishes the machining circle with a tool cutting length about 5 mm, the invoking module 12 invokes the corresponding tool wear dimension about 0.05 mm from the wear data table of the first tool 30. Thereby, the compensation module 13 adjusts a tool cutting length of the first tool 30 for 6.05 mm for a next machining cycle which previously only requires a tool cutting length about 6 mm.

Figure 2:
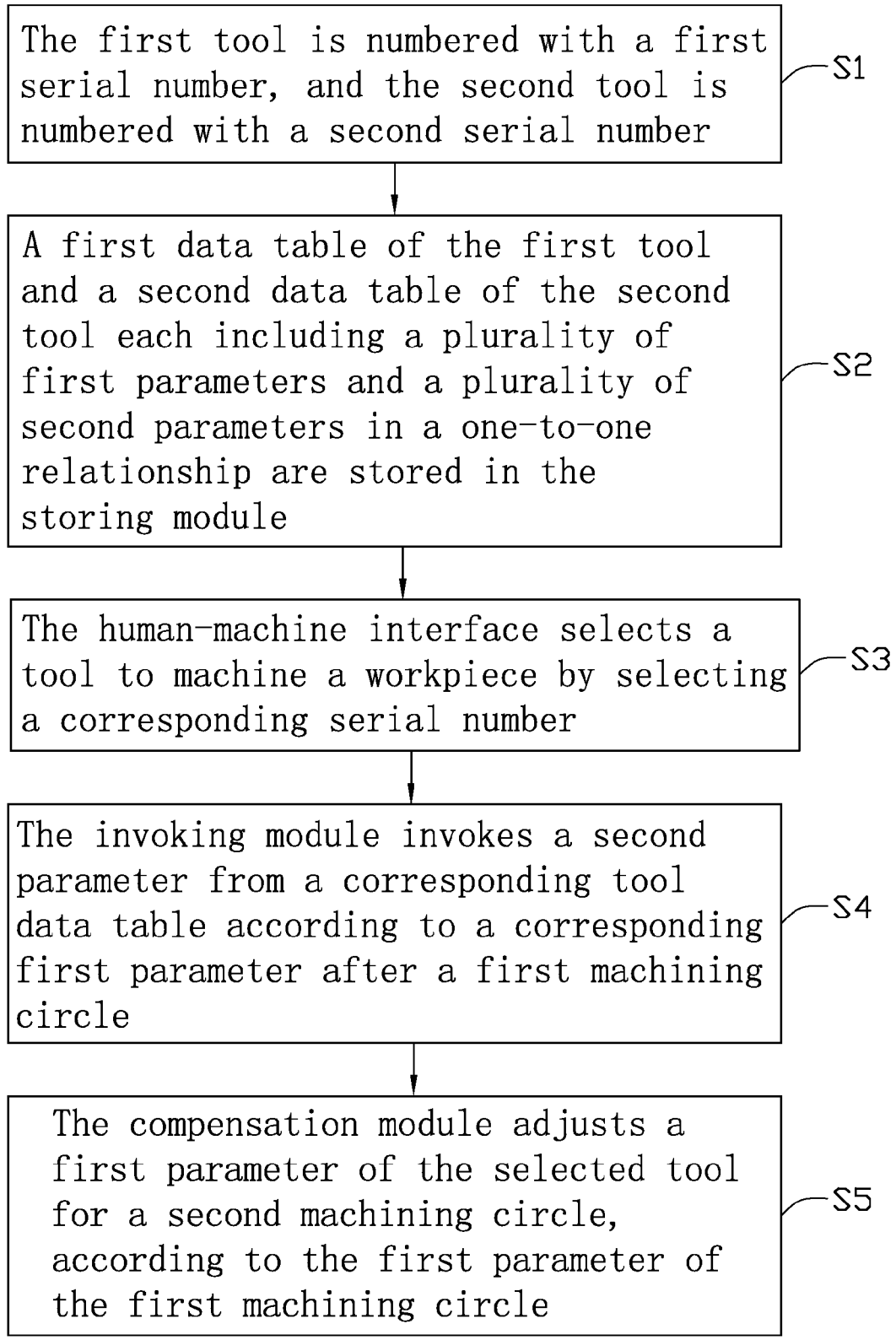
FIG. 2 is a flowchart of an exemplary embodiment of a tool compensation method for adjusting parameters of a tool.

Referring to FIG. 2, a method of tool compensation is provided, which includes the following blocks. Depending on the embodiment, certain blocks described below may be removed, others may be added, and the sequence of the blocks may be altered.

In block S1, the first tool 30 is numbered with a first serial number as K1, and the second tool 40 is numbered with a second serial number as K2.

In block S2, a first data table of the first tool 30 and a second data table of the second tool 40 each including a plurality of first dimensional parameters and a plurality of second dimensional parameters in a one-to-one relationship are stored in the storing module 11.

In block S3, the human-machine interface 20 selects the first tool 30 or the second tool 40 to machine the workpiece 50 for a machining circle by selecting the serial number K1 or K2.

In block S4, when the selected tool finishes the machining circle, the invoking module 12 invokes a corresponding second dimensional parameter from a corresponding data table according to a corresponding first dimensional parameter which is determined by the human-machine interface 20 according to the workpiece 50 after the machining circle.

In block S5, the compensation module 13 adjusts a first dimensional parameter of the selected tool for a next machining circle, according to the invoked second dimensional parameter.

In one exemplary embodiment, the storing module 11 is capable of storing wear data tables of more than two tools or only one wear data table of one tool. In another embodiment, the storing module 11 may store other kinds of data tables of tools, for example, a kind of data table including a plurality of rotate speeds and a plurality of run-out values of a spindle of a tool. Herein, the tool deviation with respect to the spindle, that is called run-out, has significant effects on cutting force variation. When the tool finishes a machining circle, the invoking module 12 invokes a corresponding run-out value to adjust a rotate speed of the spindle for a next machining circle, in order to get a high machining precision.

It is to be understood, however, that even though numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A tool compensation system for adjusting parameters for at least one tool, the system comprising:
    a selecting module capable of selecting the at least one tool for machining a workpiece; and
    a controller comprising:
        a storing module configured for storing serial numbers and data tables of the at least one tool; wherein each of the data tables comprises a plurality of first dimensional parameters and a plurality of second dimensional parameters in a one-to-one relationship; wherein each of the plurality of first dimensional parameters is determined by a machining circle;
        an invoking module configured for invoking a second dimensional parameter from a data table of the at least one tool according to a corresponding first dimensional parameter determined by a first machining circle; and
        a compensation module configured for adjusting a first dimensional parameter of a second machining cycle, according to the second dimensional parameter of the first machining circle.

2. The system of claim 1, wherein the plurality of first dimensional parameters are a plurality of tool cutting lengths of the at least one tool, and the plurality of second dimensional parameters are a plurality of tool wear dimensions of the at least one tool.

3. The system of claim 1, wherein the plurality of first dimensional parameters and the plurality of second dimensional parameters are measured manually and then stored in the storing module.

4. The system of claim 1, wherein the plurality of first dimensional parameters and the plurality of second dimensional parameters are measured by an automatic measurement system, and then stored in the storing module.

5. The system of claim 1, wherein the plurality of first dimensional parameters are a plurality of rotate speeds of a spindle of the at least one tool, and the plurality of second dimensional parameters are a plurality of run-out values of the spindle of the at least one tool.

6. The system of claim 1, wherein the selecting module is a human-machine interface.

7. A tool compensation system for adjusting parameters for a tool, comprising:
    a controller comprising:
        a storing module configured for storing a data table of the tool, wherein the data table comprises a plurality of first dimensional parameters and a plurality of second dimensional parameters in a one-to-one relationship; wherein each of the plurality of first dimensional parameters is determined by a machining circle;
        an invoking module configured for invoking a second dimensional parameter from the data table of a selected tool according to a first dimensional parameter determined by a first machining circle; and
        a compensation module configured for adjusting a first dimensional parameter of a second machining cycle, according to the second dimensional parameter of the first machining circle.

8. The system of claim 7, wherein the plurality of first dimensional parameters are a plurality of tool cutting lengths of the tool, and the plurality of second dimensional parameters are a plurality of tool wear dimensions of the tool.

9. The system of claim 7, wherein the plurality of first dimensional parameters and the plurality of second dimensional parameters are measured manually, and then stored in the storing module.

10. The system of claim 7, wherein the plurality of first dimensional parameters and the plurality of second dimensional parameters are measured by an automatic measurement system, and then stored in the storing module.

11. The system of claim 7, wherein the plurality of first dimensional parameters are a plurality of rotate speeds of a spindle of the tool, and the plurality of second dimensional parameters are a plurality of run-out values of the spindle of the tool.

12. A computer-implemented method for adjusting parameters for a plurality of tools, comprising:
    numbering the plurality of tools with a corresponding plurality of serial numbers, and storing the plurality of serial numbers in a data storage system;
    storing data tables of the plurality of tools, each data table including a plurality of first dimensional parameters and a plurality of second dimensional parameters in a one-to-one relationship, wherein the data tables are stored in the data storage system;
    selecting a tool from the plurality of tools by selecting a serial number of the tool for a first machining circle of a workpiece;
    invoking a second dimensional parameter from a data table of the tool according to a first dimensional parameter determined by the first machining circle;
    adjusting a first dimensional parameter of a second machining circle, according to the second dimensional parameter of the first machining circle.

13. The method of claim 12, wherein the plurality of first dimensional parameters and the plurality of second dimensional parameters are measured manually, and then stored in the data storage system.

14. The method of claim 12, wherein the plurality of first dimensional parameters and the plurality of second dimensional parameters are measured by an automatic measurement system, and then stored in the data storage system.

15. The method of claim 12, wherein the plurality of first dimensional parameters are a plurality of tool cutting lengths of the plurality of tools, and the plurality of second dimensional parameters are a plurality of tool wear dimensions of the plurality of tools.

16. The method of claim 12, wherein the plurality of first dimensional parameters are a plurality of rotate speeds of a spindle of the plurality of tools, and the plurality of second dimensional parameters are a plurality of run-out values of the spindle of the plurality of tools.

* * * * *